(12) United States Patent
Hesse

(10) Patent No.: US 6,913,307 B2
(45) Date of Patent: Jul. 5, 2005

(54) HARDTOP VEHICLE ROOF WITH TWO RIGID ROOF PARTS

(75) Inventor: Jan Hesse, Gechingen (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/831,044

(22) Filed: Apr. 23, 2004

(65) Prior Publication Data

US 2004/0222659 A1 Nov. 11, 2004

(30) Foreign Application Priority Data

May 5, 2003 (DE) .......................................... 103 20 171

(51) Int. Cl.[7] .............................................. B60J 10/10
(52) U.S. Cl. ............................. 296/107.17; 296/107.08; 296/108
(58) Field of Search ....................... 296/107.08, 107.11, 296/107.17, 108

(56) References Cited

U.S. PATENT DOCUMENTS

| | | | | |
|---|---|---|---|---|
| 6,217,104 B1 | * | 4/2001 | Neubrand .................. | 296/108 |
| 6,592,169 B2 | * | 7/2003 | Obendiek .............. | 296/107.17 |
| 6,652,017 B2 | * | 11/2003 | Wagner et al. ......... | 296/107.08 |
| 6,695,386 B1 | * | 2/2004 | Willard .................. | 296/107.17 |
| 2001/0040386 | * | 11/2001 | Miklosi et al. ............. | 296/108 |
| 2002/0030381 | * | 3/2002 | Schutt et al. ............... | 296/108 |
| 2003/0042751 | * | 3/2003 | Antreich ................. | 296/107.17 |
| 2003/0085587 | * | 5/2003 | Reinsch ................. | 296/107.17 |
| 2004/0004369 | * | 1/2004 | Neubrand et al. .......... | 296/108 |

FOREIGN PATENT DOCUMENTS

DE  196 42 154  4/1998

* cited by examiner

Primary Examiner—Lori L. Coletta
(74) Attorney, Agent, or Firm—Klaus J. Bach

(57) ABSTRACT

In a hardtop vehicle roof including two rigid roof parts which are movable between a closed position in which they cover an interior vehicle space and an open position in which the roof parts are deposited in a storage compartment, an operating mechanism is provided which comprises a main pivot arm, which is pivotally supported on the vehicle body and a common carrier, which is supported on the main pivot arm by an operating structure which permits the common carrier to move relative to the main pivot arm and the rigid roof parts are supported on the common carrier such that they are movable together with the common carrier relative to the main pivot arm.

10 Claims, 4 Drawing Sheets

HARDTOP VEHICLE ROOF WITH TWO RIGID ROOF PARTS

BACKGROUND OF THE INVENTION

The invention relates to a hardtop vehicle roof with two rigid roof parts which are coupled to the vehicle body by a roof operating mechanism and which are movable between a closed position and a storage position in which the roof parts are deposited in a storage space, the roof operating mechanism including a main pivot arm which is connected to the vehicle body by way of a pivot joint.

DE 196 42 154 A1 discloses a hardtop vehicle roof which is movable between a closed position in which it cover an interior vehicle space and a storage position in which the roof parts are deposited in a rear storage space. The hardtop comprises three roof parts which are interconnected in a kinematic chain wherein the rear roof part is pivotally supported on the vehicle body by a body-based pivot joint, the intermediate roof part is connected to the rear roof part by a four-link operating mechanism and the front roof part is coupled to the intermediate roof part by another roof operating mechanism. For opening, the vehicle roof is pivoted backwardly about a vehicle body-based pivot axis by almost 180°; at the same time, the intermediate roof part is pivoted into an about parallel position below the rear roof part and the front roof part is pivoted onto the bottom side of the intermediate roof part. In the storage position, the three roof parts are disposed on top of one another and form a compact storage package.

This vehicle roof however has the disadvantage that, because of the coupling of the rear roof part by way of the pivot joint on the vehicle body, the rear roof part is pivoted backwardly during movement into the storage compartment, whereby, on one hand, a relatively large space for the movement of the vehicle roof during its transfer from the closed to the storage position is needed and, on the other hand, when deposited, the vehicle roof extends to a large extent in the direction of the vehicle roof which reduces the available trunk space.

It is the object of the present invention to provide a hardtop vehicle roof in such a way that the transfer movement of the vehicle roof between its closed and open positions and also its storage position in the storage compartment require a relatively small space.

SUMMARY OF THE INVENTION

In a hardtop vehicle roof including two rigid roof parts which are movable between a closed position in which they cover an interior vehicle space and an open position in which the roof parts are deposited in a storage compartment, an operating mechanism is provided which comprises a main pivot arm, which is pivotally supported on the vehicle body and a common carrier, which is supported on the main pivot arm by an operating structure which permits the common carrier to move relative to the main pivot arm and the rigid roof parts are supported on the common carrier such that they are movable together with the common carrier relative to the main pivot arm.

The main pivot arm is supported on the vehicle body by a pivot joint and, during the transfer movement of the vehicle roof between the closed and the storage positions, moves along a partial circle with respect to the vehicle body. The common roof carrier is supported on the main pivot arm such that it is movable relative to the main pivot arm. The relative movement between the common roof carrier and the main pivot arm facilitates during the transfer movement of the vehicle roof a displacement of the roof parts relative to the main pivot arm into an ergonomic space-saving position, so that, in comparison with the state of the art arrangements, the transfer movement requires less space and also less storage space is required. In addition, the relative movement mechanism also permits the main pivot arm to be shortened so that the partial circle along which the main pivot arm moves during the transfer movement has a shortened radius and requires less space for its movement, particularly in the longitudinal vehicle direction.

Expediently, the roof carrier member is moved during movement of the roof into the storage compartment relative to the main pivot arm toward the front of the vehicle in order to provide more space in the vehicle trunk or the vehicle interior.

The transfer movement from the closed to the storage position occurs expediently in two timely subsequent steps. In a fast step at the beginning of the opening movement, the roof parts are transferred into a position in which they are disposed on top of one another so that a partial roof packet is formed. In this first step, the main pivot arm remains in its position corresponding to the closed position of the vehicle roof. Then, in the second step, the roof packet is pivoted into the storage compartment without any relative movement between the roof parts simply by a pivot movement of the main pivot arm. The relative movement between the main pivot arm and the roof carrier is preferably performed only during the first step. However, it may be suitable to execute the relative movement during the first and the second or only during the second movement step, that is, the movement of the main pivot arm.

In an advantageous embodiment, the front roof part is supported on the common roof carrier by a front roof part operating mechanism which is expediently a four-link mechanism. The rear roof part may be firmly mounted on the common roof carrier so that the rear roof part can move relative to the main pivot arm only by way of the operating mechanism for the roof carrier member. But, under certain circumstances, it may be expedient to provide for relative movement also between the roof carrier member and the rear roof part.

The hardtop vehicle roof is particularly suitable for use in a van or SUV wherein the rear roof part extends when the roof is closed back to the end of the vehicle, that is, back to a rear door which extends almost vertically when it is closed. When the vehicle roof is in the storage compartment, the whole top of the vehicle is then open.

Further advantages and suitable embodiments of the invention will become apparent from the following description on the basis of the accompanying drawings.

DESCRIPTION OF A PREFERRED EMBODIMENT

Figure 1:
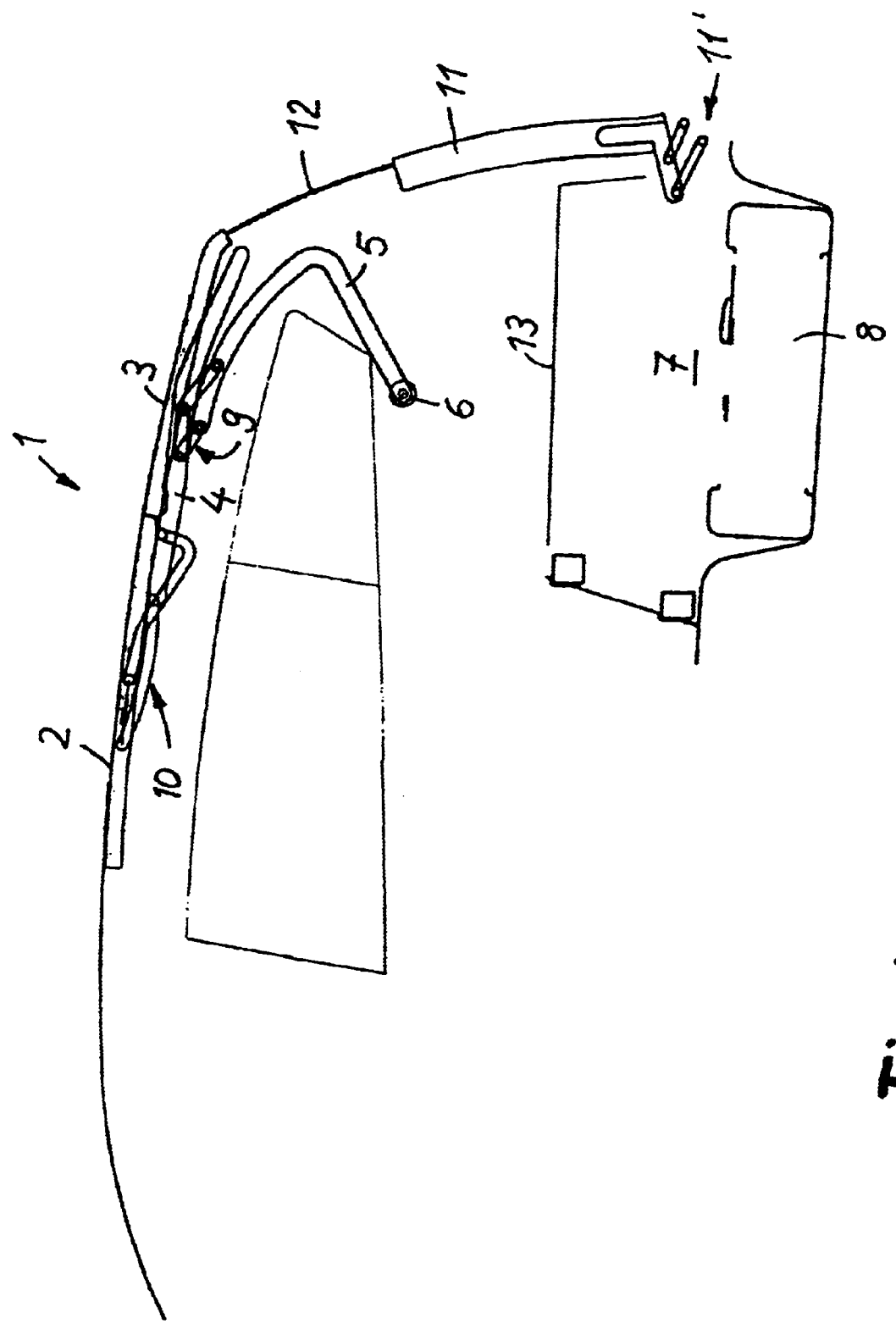
FIG. 1 shows a two-part hardtop vehicle roof in a closed position for a van or SUV with an essentially vertical rear door.

In the figures, identical components are designated by the same reference numerals.

The vehicle roof 1 shown in FIG. 1 is a hardtop vehicle roof 1 comprising two rigid roof parts 2 and 3, which, when the roof is closed, are arranged in the longitudinal vehicle direction one behind the other. The roof parts 2 and 3 are movable between the closed position shown in FIG. 1 and a storage position in which the front roof part 2 and the rear roof part 3 are deposited in a storage compartment 7 in the rear of the vehicle directly above the spare wheel 8. The storage compartment 7 can be closed by a storage compartment lid 13.

The two roof parts 2 and 3 are supported by a common carrier 4, which is coupled to a main pivot arm 5 that is pivotally supported on the vehicle body B by a pivot joint 6 having a pivot axis extending transverse to the longitudinal vehicle direction. The common carrier 4 is mounted to the main pivot arm by a relative operating mechanism 9 by way of which the common carrier 4 can be moved relative to the main pivot arm 5. This relative operating mechanism 9 is shown in the embodiment as a four-link operating mechanism. The storage compartment 7 is expediently arranged directly below the pivot joint 6 of the main pivot arm 5 so that, upon pivoting the main pivot arm 5 by about 180°, the roof parts 2 and 3 are being transferred into the storage compartment 7.

The front roof part 2 is coupled to the common carrier 4 by way of a front roof part operating mechanism 10. The rear roof part 3 however is expediently firmly connected to the common carrier 4.

The vehicle is in the form of a van, an SUV or a station wagon and includes a rear door 11, which is pivotable backwardly by a rear door operating mechanism 11'. In a closed position, it extends essentially vertically. The rear door operating mechanism 11' is disposed in the lower area of the rear door 11 so that the upper edge of the rear door can be pivoted backwardly. A rear window 12 is integrated into the rear door 11 such that it can expediently be retracted into the rear door 11 and, in its closed position, adjoins the rear roof part 3 when the vehicle roof is closed.

Figure 2:
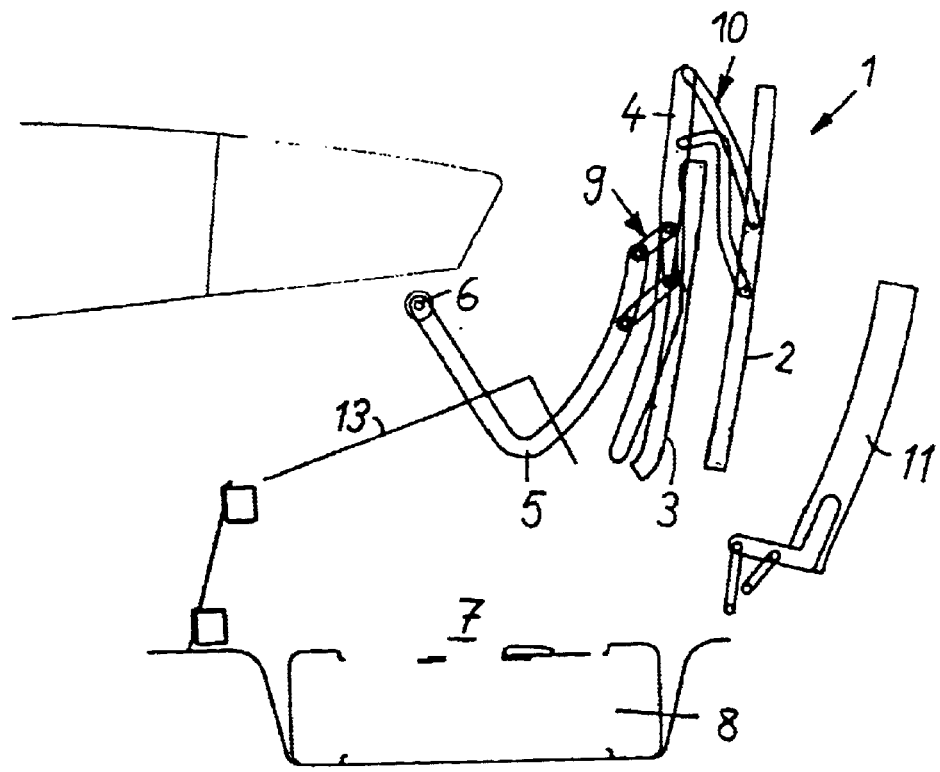
FIG. 2 shows the vehicle roof in an intermediate position during movement from the closed to the storage position.

FIG. 2 shows the vehicle roof 1 in an intermediate position between the closed and the storage positions. In a first transfer movement step, the front roof part 2 is pivoted by the operating mechanism 10 into a position on top of the rear roof part 3 so that the underside of the front roof part 2 is disposed over the outside of the rear roof part 3 and both roof parts 2 and 3 form jointly a roof part packet. In a subsequent movement step, the roof packet comprising the roof parts 2 and 3 are pivoted with the main pivot arm 5 about the pivot joint 6 by almost 180° into the storage compartment 7 on the vehicle floor whose lid 13 has first been opened. For a collision-free transfer of the vehicle roof 1 into the storage compartment 7, also the rear door 11 is flipped open toward the rear.

By operation of the operating mechanism 9 between the main pivot arm 5 and the common carrier 4, the roof part packet can be displaced rearwardly on the main pivot arm 5 (with respect to the position of the main pivot arm corresponding to the closed position of the vehicle roof). By the 180° pivot movement of the main pivot arm 5, the roof part packet including the roof parts 2 and 3 is then displaced forwardly in the storage position with respect to the main pivot arm, that is, in forward direction of the vehicle whereby the space requirements in the longitudinal vehicle direction are reduced.

Figure 3:
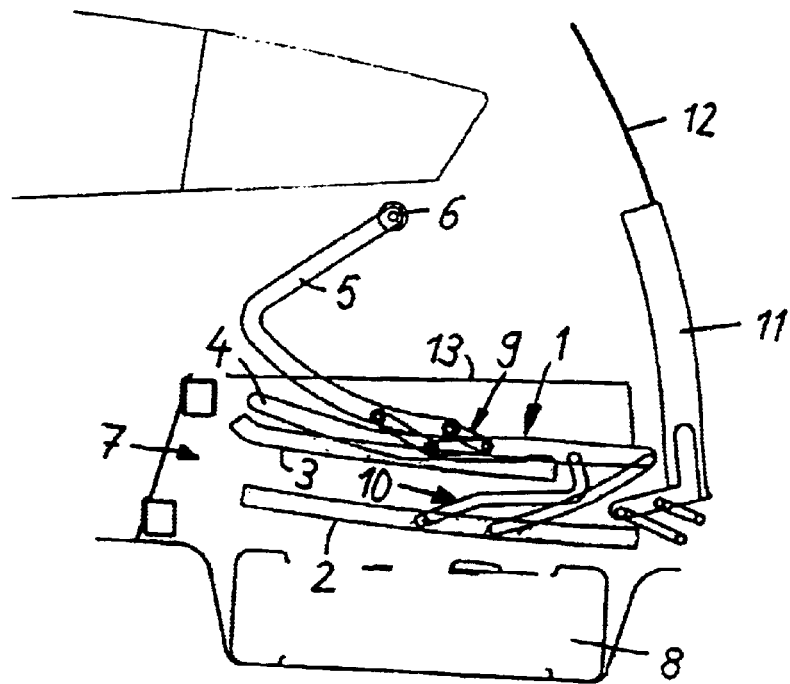
FIG. 3 shows the vehicle roof in the storage position.

FIG. 3 shows the vehicle roof in its storage position in which the roof parts 2 and 3 including the operating mechanisms are deposited in the storage compartment 7 and the storage compartment lid 13 is again closed. With the about 180° pivot movement of the main pivot arm 5 both roof parts 2 and 3 are disposed in the storage compartment with the outside of their roof facing downwardly. The rear door 11 can again be closed after the vehicle roof 1 has been deposited.

Figure 4:
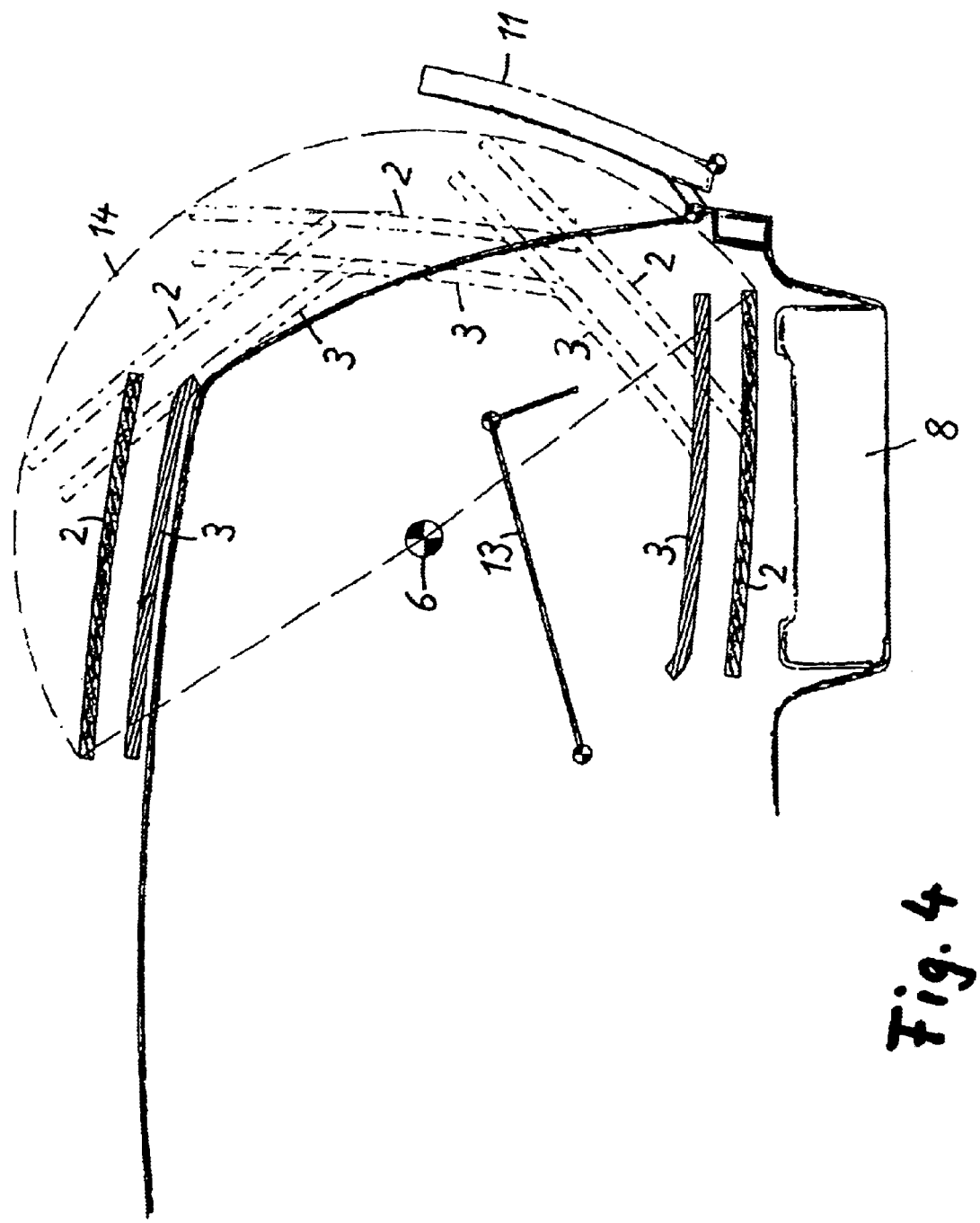
FIG. 4 is a schematic representation showing the vehicle roof in different positions during the transfer between the closed and the storage positions.

In the schematic representation in accordance with FIG. 4, the roof parts 2 and 3 are shown as a packet, in which the roof parts are disposed on top of one another, in various stages of movement during the transfer from the closed to the storage position. For the front edge of the upper, that is, the front roof part 2, the path of movement 14, that is the trajectory, is shown which is followed by the front edge of the front roof part 2 during the transfer to the storage position. Because of the pure pivot movement of the main pivot arm 5, the path of movement 14 is a partial circle, particularly half a circle. It is also apparent from FIG. 4 that the transfer movement of the vehicle roof along the path of movement 14 is performed by the whole roof part packet and that, during this transfer movement, the relative position between the two roof parts 2 and 3 is not changed.

Overall, the opening movement of the vehicle roof is divided into two movement steps: First, the roof packet is formed with the roof parts 2 and 3 disposed on top of one another while the main pivot arm 5 maintains its position. Then in a second step, the roof part packet is pivoted by the main pivot arm 5 into the storage compartment 8.

Figure 5:
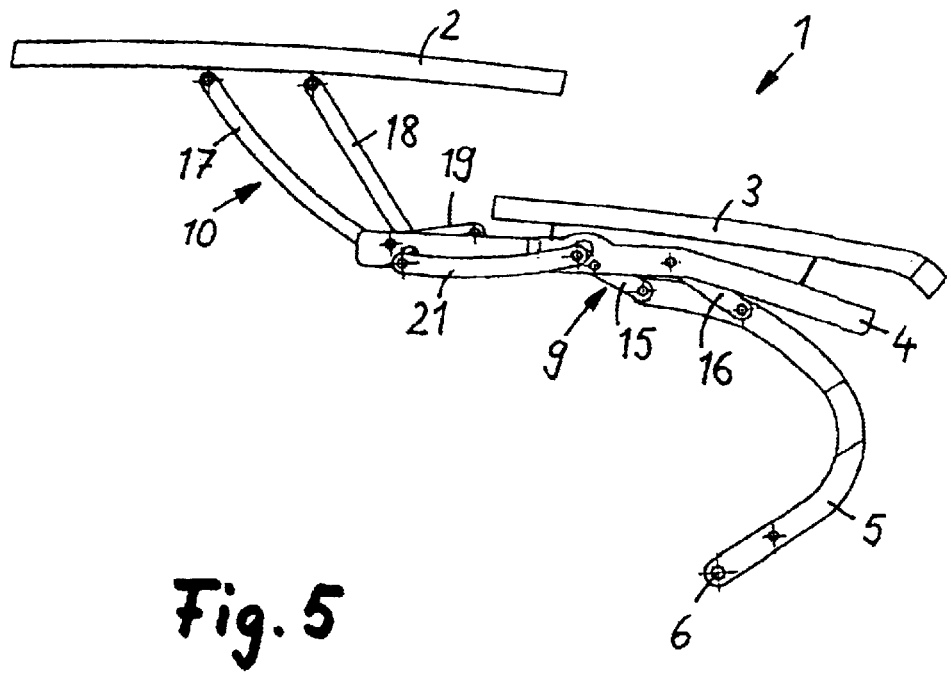
FIG. 5 shows the operating mechanism for the vehicle roof in detail.
Figure 6:
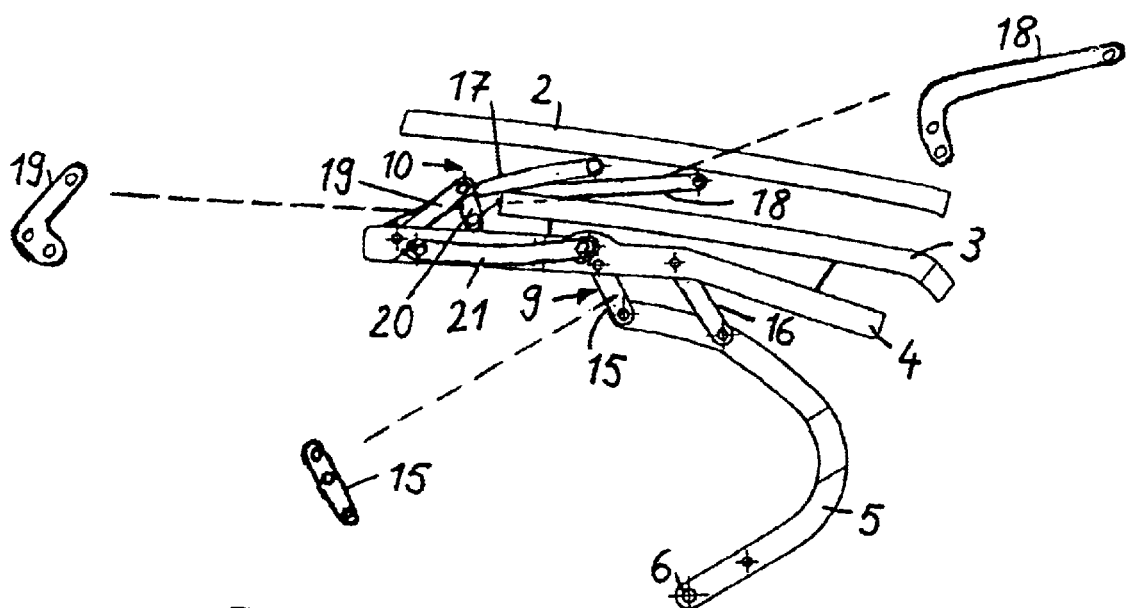
FIG. 6 shows the operating mechanism in another position of the vehicle roof.

FIGS. 5 and 6 show the relative operating mechanism 9, which is disposed between the main pivot arm 5 and the common carrier 4 and also the front roof part operating mechanism 10 between the front roof part 2 and the common carrier 4. The relative operating mechanism 9 is in the form of a four-link operating structure and comprises two links 15 and 16, which are pivotally connected each to the upper area of the main pivot arm 5 remote from the pivot joint 6 and also to the common carrier 4.

The front roof part operating mechanism 10 also comprises a four-link operating structure with a control link 17 and a main link 18. The control link 17 is pivotally connected with one end thereof to the front roof part 2 while its other end is pivotally supported on the common carrier 4. The main link 18 is also pivotally connected with one end thereof to the front roof part 2 and is pivotally supported at its other end on the common carrier 4. As made apparent in FIG. 6 by the dashed lines, the main link 18 of the front roof operating structure 10 is angled and is provided with an intermediate pivot joint by way of which it is coupled to a transfer structure for initiating the transfer motion between the relative operating mechanism 9 and the front roof part operating mechanism 10.

This motion transfer structure comprises a link section 19, a short control arm 20 and a flip-up arm 21. The intermediate pivot joint of the main link 18 of the front roof part operating mechanism 10 is pivotally connected to the short control arm 20, which is pivotally connected to the link part 19 by way of another pivot joint. This link part 19 is shown in an individual representation as an angled link, which also includes three pivot joints. By way of an outer pivot joint, the link part 19 is coupled to the short control arm 20, by way of the intermediate pivot joint, it is coupled to the common carrier 4 and by way of the opposite outer pivot joint, the link 19 is pivotally connected to the flip-up arm 21. The flip-up arm 21 is connected with its end remote from the link part 19 by pivot joint to the front link 15 of the relative operating mechanism 9. This link 15 is also shown in detail removed from the installed position to show that it includes three pivot joints of which a first pivot joint at the front end thereof is used for connection to the main pivot arm 5, the intermediate pivot joint is used for connection to the common carrier 4 and the pivot joint at the opposite end is used for connection to the flip-up arm 21. The flip-up arm 21 is additionally retained in the guide grooves or elongated holes which are formed in the common carrier 4 so as to be longitudinally movable therein.

The motion transmission between the relative operating mechanism 9 is converted by way of the slidably supported flip-up arm 21 into a pivot movement of the link part 19 about the intermediate pivot joint by which it is connected to the common carrier 4. As a result, the short control arm 20, which is coupled to the link part 19, performs a movement, which is transmitted to the main link 18. The main link 18—and consequently, also the control arm 17 of the front roof part operating mechanism 10—are as a result pivoted such that the front roof part 2 is raised and is pivoted over the rear roof part 3. At the same time, because of the movement of the relative operating mechanism 9, the common carrier 4 is pivoted back relative to the main pivot arm 5.

What is claimed is:

1. A hardtop vehicle roof (1) including two rigid roof parts (2, 3) which are supported on a vehicle body (B) by an operating mechanism so as to be movable between a closed position, in which they cover an interior space of the vehicle body (B) and a storage position in which the roof parts (2, 3) are deposited in a storage compartment (8), said operating mechanism comprising at each side of the vehicle a single main pivot arm (5) which is pivotally supported on said vehicle body (B) by a pivot joint (6), and a common carrier (4) supported on said main pivot arm (5) by a relative operating mechanism (9) permitting limited movement of said carrier member (4) relative to said main pivot arm (5), said rigid roof parts being supported on said common carrier (4), and said main pivot arm (5) being pivotable during the transfer of the vehicle roof (1) between the closed and the open positions thereof about a vehicle body-based pivot joint (6), and said roof parts (2, 3) having outer roof surfaces facing upwardly when said vehicle roof (1) is closed but facing downwardly when said vehicle roof is deposited in said storage compartment (8).

2. A hardtop vehicle roof according to claim 1, wherein said relative operating mechanism (9) between said main pivot arm (5) and said carrier member (4) is a four-link operating mechanism.

3. A hardtop vehicle roof according to claim 1, wherein said front roof part (2) is supported on said common carrier (4) by a front roof part operating mechanism (10) mounted to said common carrier (4).

4. A hardtop vehicle roof according to claim 3, wherein said front part operating mechanism (10) is firmly coupled to said relative operating mechanism (9) disposed between the main pivot arm (5) and the common carrier (4).

5. A hardtop vehicle roof according to claim 1, wherein the rear roof part (3) is firmly connected to said common carrier (4).

6. A hardtop vehicle roof according to claim 1, wherein the front roof part (2) and the rear roof part (3) are transferred during the transfer of the vehicle roof (1) between the closed and the storage position into parallel superimposed positions.

7. A hardtop vehicle roof according to claim 1, wherein the front roof part (2) is first movable into a position above the rear roof part, before both roof parts (2, 3) are moved as a packet into the storage compartment (8).

8. A hardtop vehicle roof according to claim 1, wherein the front roof part (2) is movable into a position above the rear roof part (3) during the transfer of the roof (1) from the closed position to the storage compartment (8).

9. A hardtop vehicle roof according to claim 1, wherein said vehicle includes a rear essentially vertical door (11, 12) which abuts the rear roof part (3) in the closed position of the roof (1).

10. A hardtop vehicle roof according to claim 9, wherein said rear door is pivotable backwardly for moving the vehicle roof (1) into said storage compartment (8).

* * * * *